(12) United States Patent
Gundavelli et al.

(10) Patent No.: US 12,035,157 B2
(45) Date of Patent: Jul. 9, 2024

(54) ACCESS CONNECTIVITY TROUBLESHOOTING TECHNIQUES FOR MULTI-ACCESS DEVICES IN ENTERPRISE NETWORKS

(71) Applicant: Cisco Technology, Inc., San Jose, CA (US)

(72) Inventors: Srinath Gundavelli, San Jose, CA (US); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 237 days.

(21) Appl. No.: 17/488,392

(22) Filed: Sep. 29, 2021

(65) Prior Publication Data
US 2023/0103179 A1 Mar. 30, 2023

(51) Int. Cl.
*H04W 24/04* (2009.01)
*H04W 76/10* (2018.01)
*H04W 84/12* (2009.01)

(52) U.S. Cl.
CPC ........... *H04W 24/04* (2013.01); *H04W 76/10* (2018.02); *H04W 84/12* (2013.01)

(58) Field of Classification Search
CPC ..... H04W 24/04; H04W 76/10; H04W 84/12; H04W 88/06; H04W 76/18
See application file for complete search history.

(56) References Cited

U.S. PATENT DOCUMENTS

| | | |
|---|---|---|
| 10,820,202 B1 | 10/2020 | Gundavelli et al. |
| 10,893,554 B1 | 1/2021 | Gandhi et al. |
| 2006/0209798 A1* | 9/2006 | Oikarinen ............. H04W 76/19 370/465 |
| 2014/0086043 A1 | 3/2014 | Banerjee et al. |
| 2016/0029228 A1* | 1/2016 | Mufti .................... H04W 76/19 370/225 |
| 2016/0150436 A1 | 5/2016 | Olsson et al. |
| 2017/0164221 A1 | 6/2017 | Tan Bergström et al. |
| 2019/0089579 A1 | 3/2019 | Sang et al. |
| 2019/0182666 A1 | 6/2019 | Kotay et al. |

FOREIGN PATENT DOCUMENTS

EP 2437431 A1 * 4/2012 ............ H04L 41/12

OTHER PUBLICATIONS

Gundavelli, et al., "Flow-Binding Support for Mobile IP," Internet Engineering Task Force (IETF), Request for Comments: 7629, Aug. 2015, 19 pages.

* cited by examiner

*Primary Examiner* — Mohammad S Anwar
(74) *Attorney, Agent, or Firm* — Edell, Shapiro & Finnan, LLC

(57) ABSTRACT

In an enterprise network environment where there is deployment of two (or more) types of access network technologies, when a terminal device is unable to connect to one of the access networks, techniques are presented herein that the terminal device and the network can use for sharing error conditions/cause codes/remedial hints on the access technology that the terminal device is able to connect. With this approach, self-healing, proactive reporting and diagnostic actions are brought to terminal device access connectivity issues.

20 Claims, 9 Drawing Sheets

500

| 510 | PLMN-ID | 310-015 |
| --- | --- | --- |
| 512 | NID | 0x446454 |
| 514 | NR-CGI | 0x2345455 |
| 516 | WWAN Base Station Name | ARC-16-3-GNB84171 |
| 518 | DEVICE ID | PEI/MEI/UUID |
| 520 | Timestamp | 2021 Jan 20 14:23:11 |
| 522 | Error Type | Failed to connect |
| 524 | Error ID | 0x126867868 |
| 526 | Diagnostic Log file | |

FIG. 5

ACCESS CONNECTIVITY TROUBLESHOOTING TECHNIQUES FOR MULTI-ACCESS DEVICES IN ENTERPRISE NETWORKS

TECHNICAL FIELD

The present disclosure relates to access network connectivity.

BACKGROUND

There is an interest in enterprises with existing Wi-Fi® wireless local area network (WLAN) footprint to expand and increase the wireless-coverage density by integrating Private wireless wide area network (WWAN), such as Fifth Generation (5G) wireless network coverage, into their enterprise architecture. Deploying Private WWAN as another access technology alongside Wi-Fi WLAN would mean mobile devices could connect to either of the access networks, or to both, at any given point of time. While this means users have an option between two access technology types to obtain internet connectivity or access application services, they may face connectivity issues on one access technology type. The issues could be user related, such as incorrect or expired username, password, certificate or choosing an unauthorized Service Set Identifier (SSID), Public Land Mobile Network (PLMN) identifier, or network related, such as lack coverage, interference, poor Receive Signal Strength Indicator/Signal-to-Noise Ratio (RSSI/SNR), failure to obtain an Internet Protocol (IP) address lease from a Dynamic Host Configuration Protocol (DHCP) server, etc.

A device user may not care that there is a connectivity issue on one access technology type as long as at least one of the access technology types works. However, from a network infrastructure/operator perspective, this may not be acceptable because there may be certain designed policies that are not being executed, and the network operator wants to know when this is happening and why it is happening. Further, a minor access connectivity issue can bubble up into a major issue when the user device moves into a zone where coverage is only provided by only one of the access technology types and it is that access technology type that the user device unable to connect with, leaving the user device without any connectivity. Hence, it can be useful for the network infrastructure to have visibility as to why a user device is not getting connectivity on a particular access technology type, when there is connectivity failure, or having frequent disconnections from one access technology type.

BRIEF DESCRIPTION OF THE DRAWINGS

FIG. 5 illustrates a diagram depicting examples of failure related information that may be reported in the scenario of FIG. 4, according to an example embodiment.

DESCRIPTION OF EXAMPLE EMBODIMENTS

Overview

Figure 1:
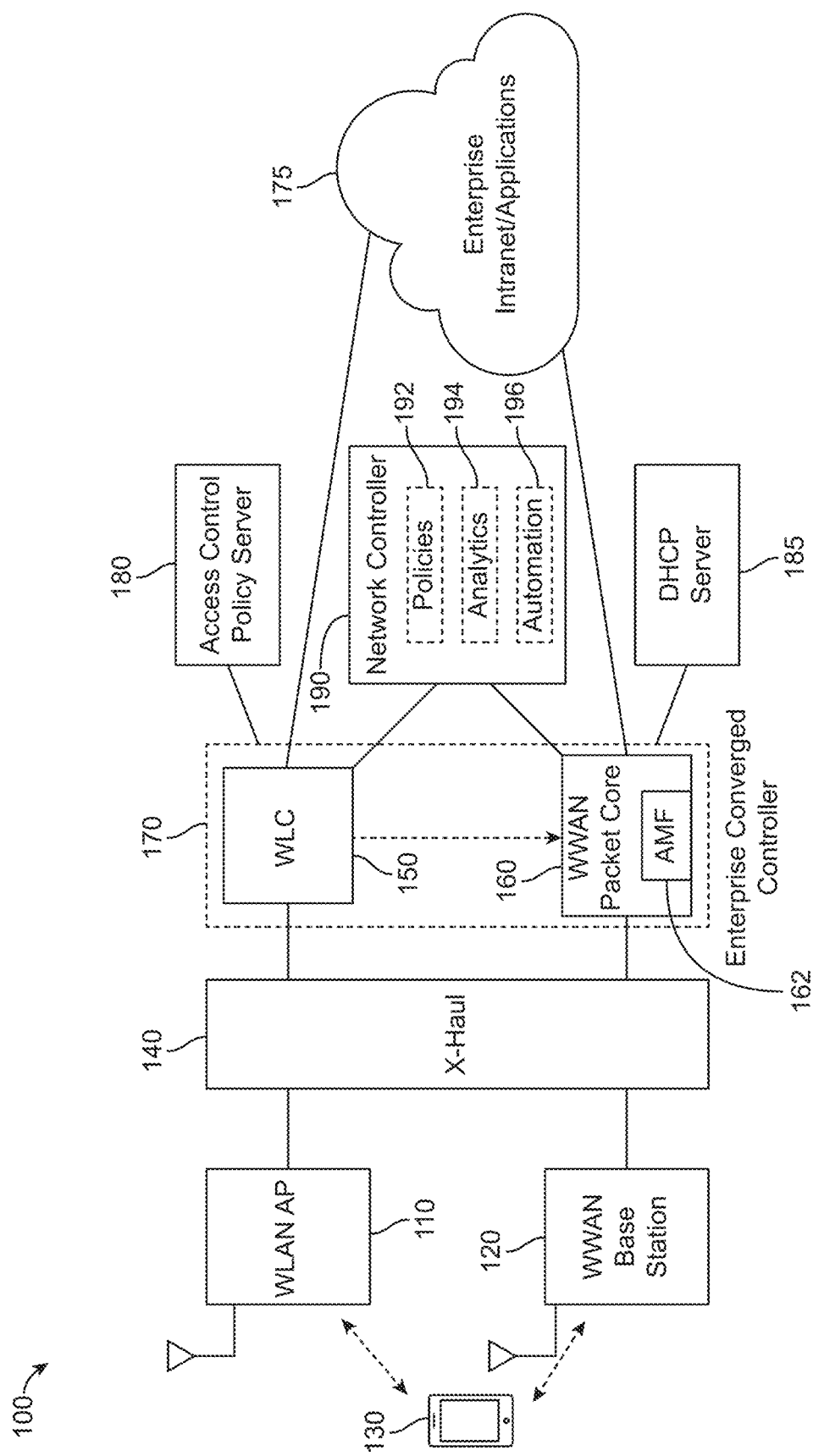
FIG. 1 is a block diagram of a network architecture in which two different access networks of different access technology types are provided and exploited for troubleshooting a failure on one access network, according to an example embodiment.

In an enterprise environment where there is deployment of two types of access network technologies and there is interworking between the two access networks (operated by the same entity/enterprise), when a terminal device is unable to connect to one of the access networks, techniques are presented herein that the terminal device and the network can use for sharing error conditions/cause codes/remedial hints on the access technology that the terminal device is able to connect. With this approach, self-healing, proactive reporting and diagnostic actions are brought to terminal device access connectivity issues.

In one form, a message is obtained that is in association with an access network connection by a terminal device via a first access network of a first access technology type, the message including failure information indicating a failure associated with an access network connection attempt by the terminal device via a second access network of a second access technology type. The failure information is analyzed to determine one or more actions to enable connectivity by the terminal device via the second access network, and the one or more actions are executed. This method may be performed by one or more entities in an enterprise infrastructure, such as a WWAN core network, wireless LAN controller or network controller.

In another form, a terminal device attempts to connect to an enterprise network, via a first access network of a first access technology type. Upon failure to connect via the first access network, the terminal device determines, based on stored information at the terminal device, an identifier of a second access network of a second access technology type for connecting to the enterprise network. The terminal device sends, via the second access network of the second access technology type, a message including failure information indicating a failure associated with an access network connection attempt by the terminal device via the first access network.

Example Embodiments

Presented herein are techniques to leverage a second access network of a second access technology type to transport error conditions observed in a first access network of a first access technology type, allowing the network infrastructure (and user device) to have a visibility of issues and take remedial actions.

In an enterprise or other environment where there is deployment of access networks of multiple access technology types (wired or wireless), such as Private WWAN (e.g., Private 5G) and Wi-Fi WLAN, a terminal device is unable to connect via one of the access networks of one access technology types, a technique is provided by which error conditions/cause codes/remedial hints may be shared via another access network of an access technology type over which terminal device is able to connect. Accordingly, self-healing, proactive reporting and diagnostic capabilities are provided for terminal device access connectivity issues.

The term "terminal device" is used to refer to a wired or wireless device that has two-way wired or wireless connectivity. The terminal device may be a User Equipment (UE) (e.g., mobile handset), Internet of Things (IoT) device, or any device now known or hereinafter developed that may need network connectivity and has the capability to connect via two or more access technology types.

The term "access technology type" refers to a wired or wireless access network technology by which a terminal device obtains network connectivity, and is meant to include wireless local area network (WLAN), such as Wi-Fi WLAN, wireless wide area network (WWAN), such as any of the $3^{rd}$ Generation Partnership Project (3GPP) standards, $4^{th}$ Generation (4G), Fifth Generation (5G) or any other WWAN, WLAN, wireless personal area network (WPAN), technology now known or hereinafter developed. The term "access technology type" may also refer to different types of wired access network technology types, such as wired access technologies, such as IEEE 802.3-based Ethernet networks.

Reference is made to FIG. 1. FIG. 1 shows a network architecture 100, such as an enterprise network architecture that deploys access networks of at least two types of access technology. In one non-limiting example, the network architecture 100 deploys a first access network of a first access technology type, which may be WLAN (e.g., Wi-Fi WLAN) and a second access network of a second access technology type, which may be WWAN (e.g., Private 5G). To this end, the network architecture 100 includes at least one WLAN access point (AP) 110 (that serves as a first access network connection point) and at least one WWAN base station 120 (that serves as a second access connection point). A terminal device 130 is shown that can connect (sequentially or simultaneously) to the WLAN AP 110 and to the WWAN base station 120.

The WLAN AP 110 and the WWAN base station 120 are connected to an x-haul network 140. The x-haul network 140 may serve as a backhaul, mid-haul, etc., network on behalf of the WLAN AP 110 and WWAN base station 120. The x-haul network 140 is in turn connected to a wireless LAN controller (WLC) 150 and to a WWAN packet core 160 (also called WWAN core network). The WWAN packet core 160 may include, among other functions or services, an Access and Mobility Management Function (AMF) 162. An AMF, as is known in the art, receives connection and session related information from user devices and handles connection and mobility management tasks. The WLC 150 and WWAN packet core 160 may be functions integrated into an enterprise converged controller 170. The WLC 150 and WWAN packet core 160 have connectivity to one or more applications/intranet enterprise resources shown at reference numeral 175.

The network architecture 100 may further include an access control policy server 180 and a network controller 190. The access control policy server 180 may perform authentication, authorization and account (AAA) and other access control services for terminal devices and users of terminal devices. A DHCP server 185 is also shown in FIG. 1. The DHCP server 185 may be involved in transactions to provide an IP address to the TD 130.

The network controller 190 may have a more global view of the network architecture 100 and manage policies 192, perform analytics 194 and initiate automation 196 of actions in the network architecture 100, as described further herein. To this end, the network controller 190 is in communication with the WLC 150 and the WWAN packet core 160. The analysis performed to diagnose the connectivity issue on an access network of one of the access technology types may be performed by the WLC 150, the WWAN packet core 160 (e.g., the AMF 162), the network controller 190, or any combination of those entities.

The techniques presented herein address the situation in which there is a connectivity problem on a first access network of a first access technology type to an enterprise network, but there is a way to use connectivity on a second access network of a second access technology type to diagnose the problem on the first access technology type. There could be a failure on the terminal device side (client side) that the network infrastructure side is not aware, or a failure on the network infrastructure side that the client side is not aware.

In accordance with some aspects presented herein, techniques are provided that are performed by one or more entities/elements on the infrastructure side (e.g., WLC 150, AMF 162 and/or network controller 190). These techniques involve obtaining a message in association with an access network connection by a terminal device via a first access network of a first access technology type, the message including failure information indicating a failure associated with an access network connection attempt by the terminal device via a second access network of a second access technology type; analyzing the failure information to determine one or more actions to enable connectivity by the terminal device via the second access network, and executing the one or more actions.

In addition, in accordance with some aspects presented herein, techniques are provided that are performed by a terminal device, in which, the terminal device attempts to connect to an enterprise network, via a first access network of a first access technology type. Upon failure to connect via the first access network, the terminal device determines, based on stored information at the terminal device, an identifier of a second access network of a second access technology type for connecting to the enterprise network. Next, the terminal device sends, via the second access network of the second access technology type, a message including failure information indicating a failure associated with an access network connection attempt by the terminal device via the first access network.

As described further below, the terminal device is configured with appropriate credentials and knowledge about the two access networks that it can use to access a given enterprise network.

As an example, a terminal device may have an incorrect version of a WLAN driver client software. On the WWAN link, the terminal device can be instructed to do an update of the WLAN driver software. As another example, if the terminal device is configured with an incorrect authentication certificate for a first access network, the network infrastructure can securely push the correct certificate to the terminal device via a second access network. Some sort of self-correction can be directed at the terminal device side or network infrastructure side, or instructions can be sent to a user at the terminal, so that the next time the terminal connects on that access technology type, the connectivity should work.

As another example, connectivity to an authentication server may be lost or is taking too long (too much latency and time-out occurs). This could be happening with respect to all WLAN traffic, for example. In either case, an alert can be provided to a network administrator to troubleshoot the connection to the authentication server or automatically reset the connection to the authentication server. Thus, this is the sort of scenario that may occur in the other direction— from the terminal device logs that result in an instruction or remediation on the network side.

The failure report may contain information indicating what was the terminal device was trying to do (how it was trying to access the enterprise network), what was the failure, where (which network element) was the failure, and what the error is that the terminal device sees (in a log file).

The failure reporting may occur in both directions, from the terminal device to the network infrastructure and from the network infrastructure to the terminal device. In other words, the network infrastructure can inform the terminal about what the network infrastructure is seeing.

Using a log file obtained for a failure event, it is possible to determine that the terminal device is using an out-of-date version of software or expired certificate, and that is why the connection is not working. The remediation is made down to the terminal device where the fix can be automatically made at the terminal device or instructions provided to the user to make the fix.

The embodiments presented herein leverage a correlation maintained both at the terminal device and in the infrastructure between an identifier associated with a first access network of a first access technology type (e.g., a WLAN SSID) and an identifier of a second access network of a second access technology type, such as a WWAN (private 5G) identifier, e.g., a PLMN-ID, PLMN-ID+Network Identifier (NID), etc. The NID identifies a particular tenant on a PLMN-ID. For example, there is a configuration made on the terminal device to indicate that a particular SSID (or multiple SSIDs) and private 5G identifiers correspond to the same enterprise network. Similarly, information is maintained on the network side to indicate that one or more SSIDs and private 5G identifiers correspond to the same enterprise network. Thus, a mapping is maintained between the WWAN identifier and the SSIDs. For example, a WLAN SSID may be Avalanche and it may be mapped to a PLMN-ID of 0123, and be associated with the same enterprise. In addition, on the network side, the access identifier that a terminal device uses correlated across access networks.

As an alternative, the terminal device may be provided with the identity of a second access network as part of its connection establishment to the first access network. Thus, there need not be a static configuration mapping between the two access networks at the terminal device. This latter scenario may have more practical application than statically configuring this mapping on every terminal device.

Thus, entities in the network infrastructure side, such as the WLC 150, WWAN packet core 160 and network controller 190 have the capability to identify terminal device sessions across access networks (Wi-Fi and Private 5G). This is possible using the access control policy server 180, which may be an enterprise authentication and policy server, such as an Authentication, Authorization and Accounting (AAA) server or an AAA server interfacing with a Home Subscriber Server (HSS), Unified Data Management (UDM) entity or Unified Data Repository (UDR) entity that correlates the sessions originating from the same device or different access networks, using various protocols such as the Extensible Authentication Protocol (EAP) or non-EAP authentication protocols.

In addition, the WLC 150, WWAN packet core 160 and network controller 190 may be configured to maintain a mapping of first access network identifier, such as a Wi-Fi WLAN identifier (e.g., SSID) and second access network identifier, such as a WWAN identifier to the same enterprise network. Moreover, the WLC 150 or WWAN packet core 160 may notify the terminal device 130 of this same mapping so that the terminal device 130 knows that it connects to the same enterprise network when it uses the configured WLAN SSID (or multiple SSIDs) and WWAN identifier (or multiple WWAN identifiers).

Figure 2:
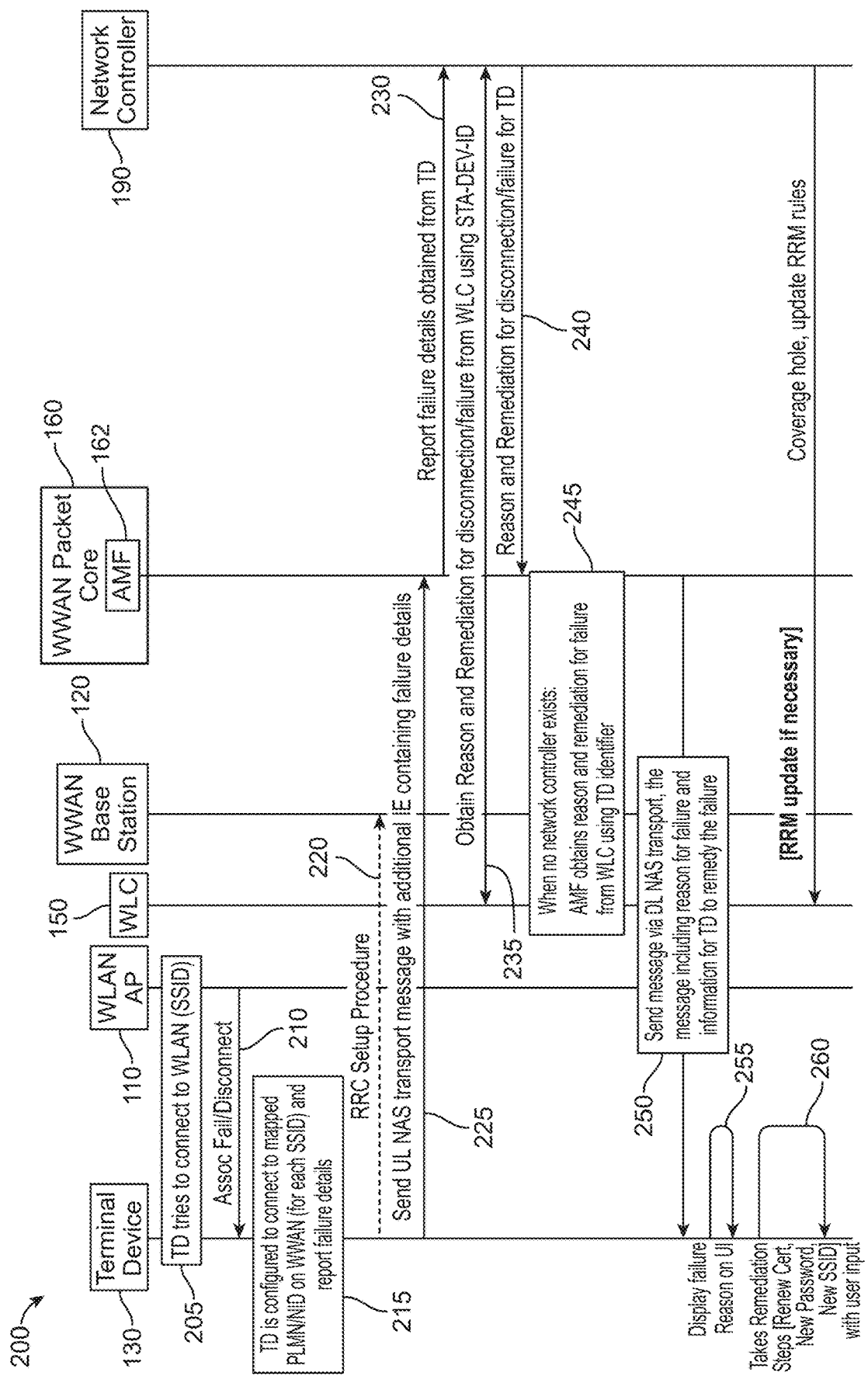
FIG. 2 is a sequence diagram depicting an example scenario in which a connectivity failure occurs on a WLAN and a failure report is sent via a WWAN, according to an example embodiment.

Reference is now made to FIG. 2. FIG. 2 shows a sequence diagram of a process 200 by which a terminal device fails to connect/authenticate on a Wi-Fi WLAN, as an example. As shown at 204, the terminal device (TD) 130 tries to connect to the WLAN via WLAN AP 110. At 210, an association failure/disconnect notification is sent by the WLAN AP 110 to the TD 130. Thus, the TD 130 did not succeed in connecting to the WLAN access network.

At 215, the TD 130 is configured to connect to a WWAN identifier, e.g., PLMN-ID, PLMN-ID+NID, etc., for which the TD 130 has stored a mapping, based on a prior configuration or obtained during a prior connection to the enterprise network, and furthermore is configured to report failure details via the WWAN access network. This also avoids the TD sending failure details via to a non-enterprise network. At 220, the TD 130 initiates a Radio Resource Control (RRC) setup procedure with the WWAN base station 120 to establish WWAN connectivity.

Next, at 225, the TD initiates an uplink (UL) Non-Access Stratum (NAS) Transport message towards the AMF 162. This message includes an additional information element (IE) that contains failure/error details observed by the TD 130 on the WLAN access attempt at 205. These error/failure details may include, for example, an identifier of the TD (STA-DEV-ID), WLAN identifier (AP-Basic Service Set Identifier (BSSID)), identifier of the WLAN AP 110 (AP-name), SSID, timestamp and error type.

This IE is bidirectional: UE→Network as well as Network→UE. The IE value carries the failure details seen on the access technology type that experienced the failure.

The AMF 162 in the WWAN packet core 160, at 230, may transfer the failure details obtained in the UL NAS transport message sent at 225, to the network controller 190. By sharing the failure details with the network controller 190, visibility of the failure details may be provided to a network administrator (who has access to dashboards maintained by the network controller 190). In addition, the WWAN packet core 160 and/or the network controller 190 may validate (compare) the access network identifier over which the message reporting the access network failure, against an access network identifier for the access network that experienced the failure. For example, this validating/comparing may involve validating/comparing a second access network identifier contained in the message that is associated with the second access network, against a first access network identifier associated with the first access network over which the message is received, and determining to execute one or more actions based on the validating/comparing.

At 235, the network controller 190 sends a request to the WLC 150 for the details associated with the failure of the TD 130 to connect to the WLAN access network. The request sent at 235 includes an identifier of the TD 130, e.g., the STA-DEV-ID of the TD 130. The WLC 150 responds to the request with the details associated with the failure. The network controller 190 determines one or more actions (such as a remediation or configuration change) to address the failure, and at 240, sends a message containing information describing the reason for the failure and one or more actions to address the failure.

As shown at 245, if no network controller 190 exists in a given enterprise network architecture, then the AMF 162 obtains the reason for the failure and associated one or more actions from the WLC 150. At 250, the AMF 162 sends a message via the DL NAS transport, the message including information describing the reason for the failure and information for the TD 130 to remedy the failure, such as renewed certificate, new password, new SSID, etc.

The TD 130 receives the message from the AMF 162, forwarded by the WWAN base station 120. The message received at the TD 130 may include text content to be presented on a user interface (UI) of the TD 130 in order to indicate, at 255, to a user the reason for not getting connectivity. For example, a simple, easy-to-understand message may be presented that says "TD is far away from Wi-Fi AP and needs to come closer to obtain connectivity" or the "Wi-Fi AP is overloaded try again after 60 secs".

In another embodiment, the network controller 190 (or WLC 150 or AMF 162) may be configured to take one or more remedial actions. For example, it may be determined that the TD 130 failed to connect via the WLAN AP 110 due to the TD 130 using an incorrect SSID. When this occurs, the mapped SSID may be validated against the PLMN on which UL NAS transport message is received at 225. The network controller 190 (or WLC 150) may instruct the AMF 162 to initiate the DL NAS transport message to the TD 130 as shown at 250, where the message includes an additional IE (network→TD) that contains the correct SSID that the TD 130 should use to connect to the WLAN AP 110.

As another example, it may be determined that the TD 130 failed to connect via the WLAN AP 110 due to use of an incorrect or expired username, password or certificate. In this case, the network controller 190 (or WLC 150) instructs the AMF 162 to initiate the DL NAS transport message to the TD 130 with an additional IE that contains the correct username, password and optional renewed certificate to be used by the TD 130.

At 260, the user of the TD 130 make take remedial steps based on information contained in the message from the AMF 162. For example, the user may save the renewed certificate, save a new password, save a new SSID, etc., and then re-attempt to connect to the WLAN AP 110.

Other actions may be taken in the network infrastructure side. For example, the network controller 190 (or WLC 150) may restore connectivity with the access control policy server 180 or with the DHCP server 185. As another example, the network controller 190 (or WLC) may detect a coverage hole and take an action to update a configuration of the WLAN AP 110 (or another WLAN AP) via a Radio Resource Management (RRM) algorithm to remediate the coverage hole.

Figures 3A, 3B:
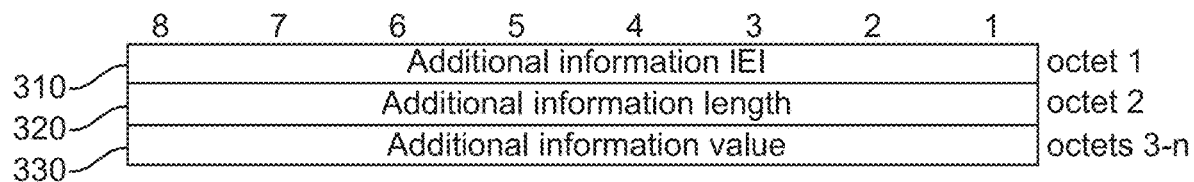
FIG. 3A illustrates a diagram of an information element that may be used to transport failure related information, according to an example embodiment.
FIG. 3B illustrates a diagram depicting examples of failure related information that may be reported in the scenario of FIG. 2 and carried in the information element depicted in FIG. 3A, according to an example embodiment.

Reference is now made to FIGS. 3A and 3B. FIG. 3A illustrate a general format of an additional IE 300 that may be included in the UL NAS transport message sent at 225 in FIG. 2. The additional IE 300 may include, in a first octet (octet 1), an additional information IEI 310, a length in a second octet (octet 2) 320, and additional information value 330 in octets 3—n.

In general, the element that carries the log and other information can be an IE, a NAS ID or some other control message that carries the failure information and on what interface the failure occurred, etc. Examples of other elements that may carry the error/log information may include, for Wi-Fi WLAN, an IEEE 802.11u Access Network Query Protocol (ANQP), Generic Advertisement Service (GAS) frames, and for WWAN, the Access Network Discovery and Selection Function related communications, UE Route Selection Policy (URSP), NAS protocols. Moreover, security protocols, such as EAP and non-EAP protocols may carry the error/log information.

FIG. 3B shows examples of various content of the additional information value 330. The additional information value 330 may include a SSID-name 332 that the TD 130 used to attempt to connect to WLAN AP 110, the AP-name 333 of the WLAN AP 110 that the TD 130 attempted to connect through, the device ID 334 of the TD 130, the AP BSSID 335 of the WLAN AP 110, the error type 336 ("Failed to connect"), error ID 337, timestamp 338 of the failure and a diagnostic log file 339. The diagnostic log file 339 may likewise specify the TD identity, network identity, time, location and the failure event.

Figure 4:
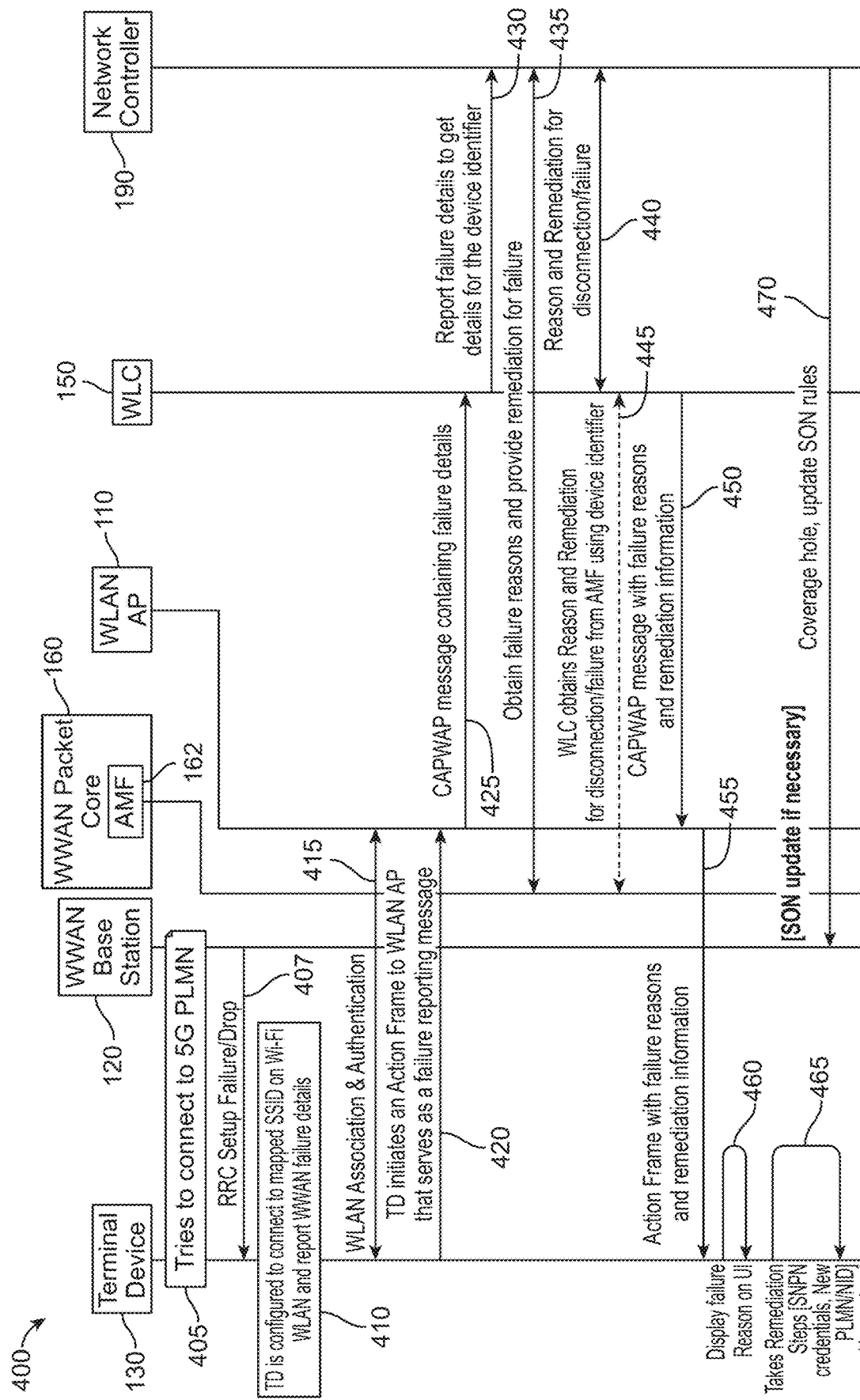
FIG. 4 is a sequence diagram depicting an example scenario in which a connectivity failure occurs on a WWAN and a failure report is sent via a WLAN, according to an example embodiment.

FIG. 4 shows a sequence diagram showing a process 400 performed when the TD 130 fails to connect or authenticate to a WWAN, e.g., a Private 5G network. At 405, the TD 130 attempts to connect to the WWAN, e.g., a 5G PLMN supported by WWAN base station 120, but the connection attempt fails as shown at 407.

For example, the TD 130 may be facing issues in connecting to the WWAN base station 120 because the WWAN base station 120 is overloaded and thus configured not to respond to any RRC setup request, or the TD 130 fails to obtain an IP address allocated from the external DHCP server.

As shown at 410, the TD 130 maintains a PLMN-ID/PLMN-ID+NID<→SSID mapping for the enterprise network and at 415 seeks association and authentication via the WLAN AP 110. Again, the TD 130 is configured with the enterprise SSID where failure reporting needs to happen, to avoid sending failure details to a non-enterprise network).

At 420, the TD 130 initiates an Action Frame (e.g., an IEEE 802.11 Action Frame) to the WLAN AP that serves as a failure reporting message. The failure reporting message includes an enhanced "Enterprise STA Data" IE container. This IE may be bidirectional: UE→Wi-Fi Access as well as Wi-Fi Access→UE. An example of this IE container is described below in connection with FIG. 5. This IE may include a name of the WWAN base station 120 (e.g., gNodeB name), device identifier (DEV-ID), PLMN-ID, Network Identifier (NID), timestamp, error type, a diagnostic log file.

At 425, the WLAN AP 110 sends to the WLC 150 a control layer message. The control layer message may be sent as a Control and Provisioning of Wireless Access Points (CAPWAP) message or any other suitable protocol mechanism message, containing the failure details obtained from the message received at 420 from the TD 130.

At 430, the WLC 150 transfers the failure details to the network controller 190. By sharing the failure details with the network controller 190, visibility of the failure details may be provided to a network administrator (who has access to dashboards maintained by the network controller 190).

This also allows the network controller 190, at 435, to obtain the failure details (reasons) from the AMF 162 (in the WWAN packet core 160) and to send remediation for the failure to the TD 130 for informational purpose, for example. The remediation may be tied to a device identifier associated with the TD 130.

At 440, the network controller 190 sends to the WLC 150 a message containing information indicating the failure reasons as well as any remediation for the failure.

Alternatively, at 445, if there is no network controller 190 in a given enterprise network deployment, the WLC 150 obtains the failure reason and remediation from the AMF 162 using the device identifier (of the TD 130) as a reference.

At 450, the WLC 150 sends to the WLAN AP 110 a control layer message that includes the failure related information and remediation information as well. For example, the remediation information may include Stand-alone Non-Public Network (SNPN) credentials and/or a new WWAN ID, e.g., PLMN-ID/PLMN-ID+NID, etc.

At 455, the WLAN AP 110 sends to the TD 130 an (IEEE 802.11) Action Frame that contains the failure reasons and remediation information. At 460, the TD 130 presents the failure reasons on a user interface to a user. In addition, at 465, the TD 130 takes remediation steps, either autonomously, or with the assistance of a user. Such remediation steps may, based on the remediation information included in the Action Frame sent at 455, include configuring new SNPN credentials, a new WWAN identifier, such as any combination of PLMN-ID, PLMN-ID+NID, etc.

Using the example above, a simple, easy to understand message may be presented on the TD 130 indicating "5G radio is overloaded and thus device cannot connect now but should try after 1 min" or "5G AP is overloaded try again after 60 secs" or "Network is undergoing maintenance until 2:00 AM", etc.

In further embodiment, the network controller 190 or another infrastructure entity may take remedial actions. For example, in the case of an incorrect WWAN identifier (e.g., PLMN-ID or PLMN-ID+NID), the network controller 190 may validate the mapped WWAN identifier against the SSID on which a WLAN Action Frame is received. The network controller 190 may send a message to the WLC 150 to initiate an Action Frame to the TD 130 with a vendor specific IE (an enterprise infrastructure IE) that contains the correct WWAN identifier details that TD 130 should use to connect to the WWAN.

In another example, in the case of an invalid or no SNPN configuration, the network controller 190 may instruct the WLC 150 to initiate an EAP Session (EAP-Type=EAP-SNPN-CFG) with the TD 130. The EAP session would be used to transfer an SNPN configuration (embedded-SIM (Subscriber Identity Module) or non-SIM credentials) to TD 130.

In still another example, when the failure occurred due to a lost connection with a DHCP server, the network controller 190 may initiate a repair of the connectivity between the Session Management Function (SMF) or other function in the WWAN packet core 160 and the DHCP server.

In yet another example, the network controller 190 may update a coverage map with a coverage hole and inform a WWAN base station or other function, such as a self-organizing network (SON) function, of the reported coverage hole. This is shown at 470 in FIG. 4 where the WWAN may be reconfigured to repair the coverage hole or update one or more policy/rules, such as SON rules.

FIG. 5 shows an example of an enterprise STA data value 500 that may be carried in an IE of the Action Frame that the TD 130 sends to the WLAN AP 110 at 420 in FIG. 4. There is a PLMN-ID 510, a NID 512, New Radio-Cell Global Identity (NR-CGI) 514, a WWAN base station name 516, device ID 518, timestamp 520, error type 522 (Failed to connect), error ID 524 and diagnostic log file 526.

Figure 6:
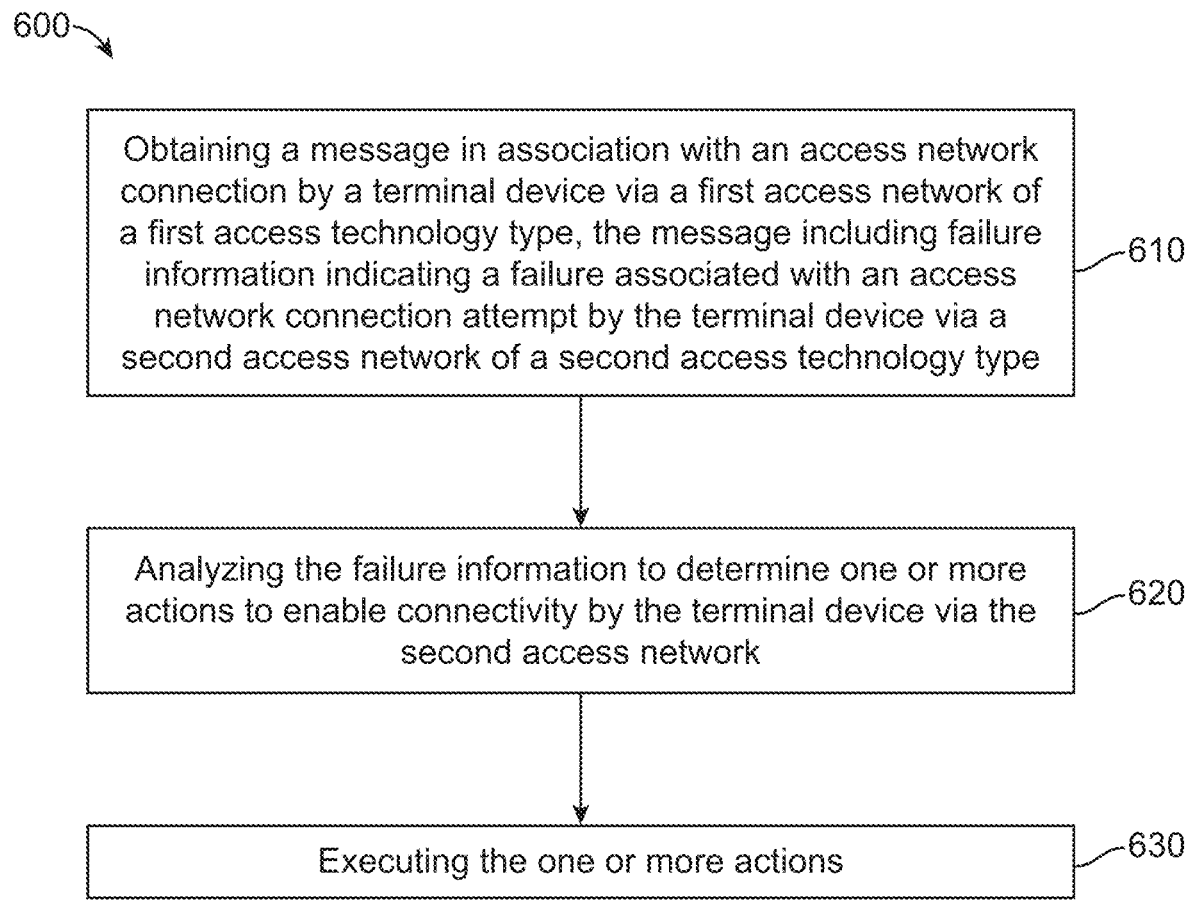
FIG. 6 is a flow chart depicting operations performed by one or more network infrastructure entities to address failure information associated with a connectivity attempt to an access network, according to an example embodiment.

Reference is now made to FIG. 6. FIG. 6 illustrates a flow chart depicting a method 600 performed on the infrastructure side of the network architecture 100 depicted in FIG. 1. The method 600 may be performed by the WLC 150, AMF 162 (or other function or entity in the WWAN packet core 160) or network controller 190, or combinations of these elements/entities. The method 600 includes, at step 610, obtaining a message in association with an access network connection by a terminal device via a first access network of a first access technology type. The message includes failure information indicating a failure associated with an access network connection attempt by the terminal device via a second access network of a second access technology type. At step 620, the method 600 includes analyzing the failure information to determine one or more actions to enable connectivity by the terminal device via the second access network. At step 630, the method 600 includes executing the one or more actions.

Thus, in some aspects, the techniques described herein relate to a method including: obtaining a message in association with an access network connection by a terminal device via a first access network of a first access technology type, the message including failure information indicating a failure associated with an access network connection attempt by the terminal device via a second access network of a second access technology type; analyzing the failure information to determine one or more actions to enable connectivity by the terminal device via the second access network; and executing the one or more actions.

In some aspects, the obtaining in step 610 includes receiving the message sent by the terminal device to an infrastructure entity in an enterprise network. For example, the WLC 150 may exchange with the WWAN packet core 160, session data received from the TD 130. The WWAN packet core 160, upon receiving the client reported failure event on the WLAN, pushes the failure event related information to the WLAN, e.g., to the WLC 150, to enable the WLC 150 to take action to address the failure event.

In some aspects, the failure information in the message indicates one or more failure details associated with the access network connection attempt via the second access network.

In some aspects, executing the one or more actions includes sending an information message to the terminal device for presentation to a user of the terminal device, the information message containing user instructions to enable connectivity by the terminal device via the second access network. In some aspects, the user instructions include one or more of: a second access network identifier to be used by the terminal device to connect via the second access network, a correct user name, and a correct password.

In some aspects, executing the one or more actions includes: sending a configuration message to the terminal device, wherein the configuration message includes content to cause a configuration change at the terminal device in order to enable connectivity via the second access network. In some aspects, the content includes a certificate to be used by the terminal device to connect via the second access network.

In some aspects, the techniques described herein relate to a method, further including: validating a second access network identifier contained in the message that is associated with the second access network, against a first access network identifier associated with the first access network over which the message is received; and determining to perform the executing of the one or more actions based on the validating.

In some aspects, executing the one or more actions includes restoring connectivity between a network infrastructure entity and one or more of: an access control policy server, and a dynamic host configuration protocol (DHCP) server.

In some aspects, executing the one or more actions includes: detecting a coverage hole of the second access network; and changing a configuration on one or more transceiver devices that serve connectivity via the second access network.

In some aspects, the step 610 of obtaining includes receiving the message sent by a first infrastructure entity in an enterprise network to a second infrastructure entity in the enterprise network or to the terminal device.

In some aspects, the first access technology type of the first access network is a wireless local area network technology and the second access technology type of the second access network is a wireless wide area network technology, or the first access technology type of the first access network is a wireless wide area network technology and the second access technology type of the second access network is a wireless local area network technology.

In some aspects, the techniques described herein relate to a method, the message is a WLAN (e.g., Wi-Fi) access protocol message, a WWAN (e.g., 5G) access protocol message, or a security protocol message that can be used for carrying failure events between the TD and the network infrastructure.

In some aspects, one or more of obtaining, analyzing and executing is performed at one or more of: a first controller for the first access network, a second controller for the second access network, a global controller coupled to the first controller and the second controller, and a converged controller that controls operations for the first access network and the second access network.

Figure 7:
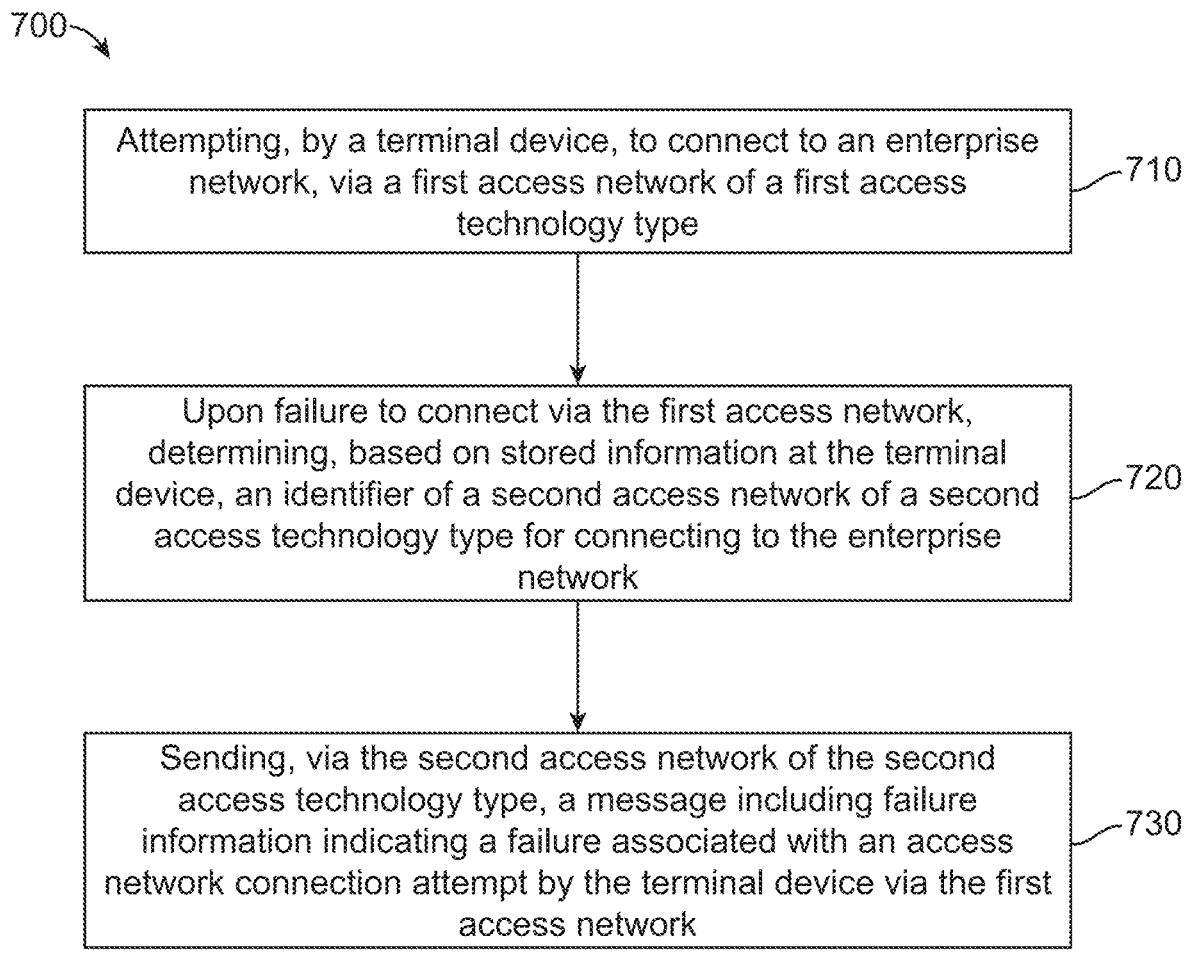
FIG. 7 is a flow chart depicting operations performed by a terminal device to address a failure associated a connectivity attempt to a network, according to an example embodiment.

Reference is now made to FIG. 7. FIG. 7 illustrates a flow chart of a method 700 performed by a terminal device, according to embodiments presented herein. The method 700 includes, at step 710, attempting, by a terminal device, to connect to an enterprise network, via a first access network of a first access technology type. Upon failure to connect via the first access network, the method 720 includes determining based on stored information at the terminal device, an identifier of a second access network of a second access technology type for connecting to the enterprise network. At step 730, the method 700 includes sending, via the second access network of the second access technology type, a message including failure information indicating a failure associated with an access network connection attempt by the terminal device via the first access network.

Thus, in some aspects, the techniques described herein relate to a method including: attempting, by a terminal device, to connect to an enterprise network, via a first access network of a first access technology type; upon failure to connect via the first access network, determining, based on stored information at the terminal device, an identifier of a second access network of a second access technology type for connecting to the enterprise network; and sending, via the second access network of the second access technology type, a message including failure information indicating a failure associated with an access network connection attempt by the terminal device via the first access network.

In some aspects, the method 700 further includes, upon failure to connect via the first access network: establishing an access network connection via the second access network to connect to the enterprise network.

In some aspects, the 700 method further includes: receiving an information message for presentation to a user of the terminal device, the information message containing user instructions to enable connectivity by the terminal device via the first access network. In some aspects, the user instructions include one or more of: a second access network identifier to be used by the terminal device to connect via the second access network, a correct user name, and a correct password.

In some aspects, the method 700 further includes: receiving a configuration message that includes content to cause a configuration change at the terminal device in order to enable connectivity via the first access network. In some aspects, the content includes a certificate to be used by the terminal device to connect via the first access network.

Figure 8:
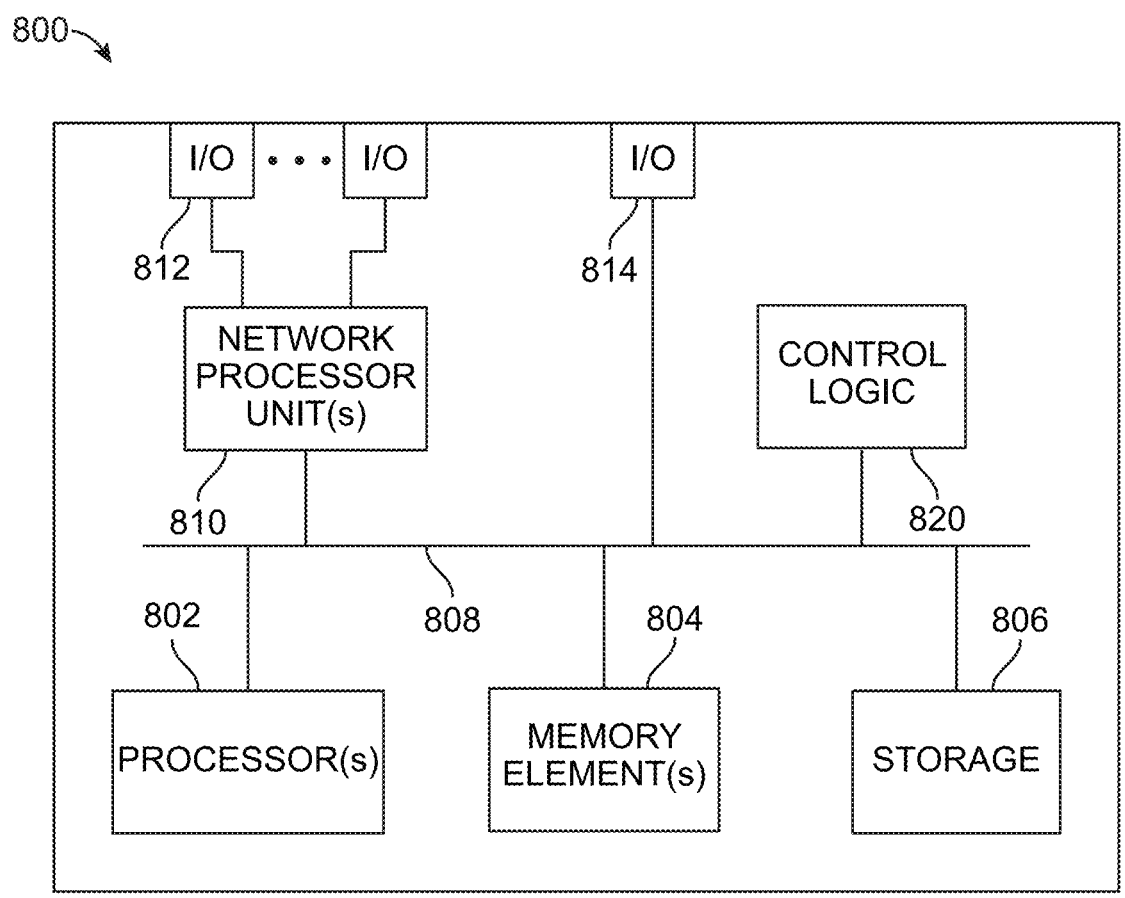
FIG. 8 is a block diagram of a network infrastructure element configured to perform the techniques presented herein, according to an example embodiment.

Referring to FIG. 8, FIG. 8 illustrates a hardware block diagram of a computing device 800 that may perform functions associated with an infrastructure entity or device (shown in FIG. 1) discussed herein in connection with the techniques depicted in FIGS. 1-6.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Figure 9:
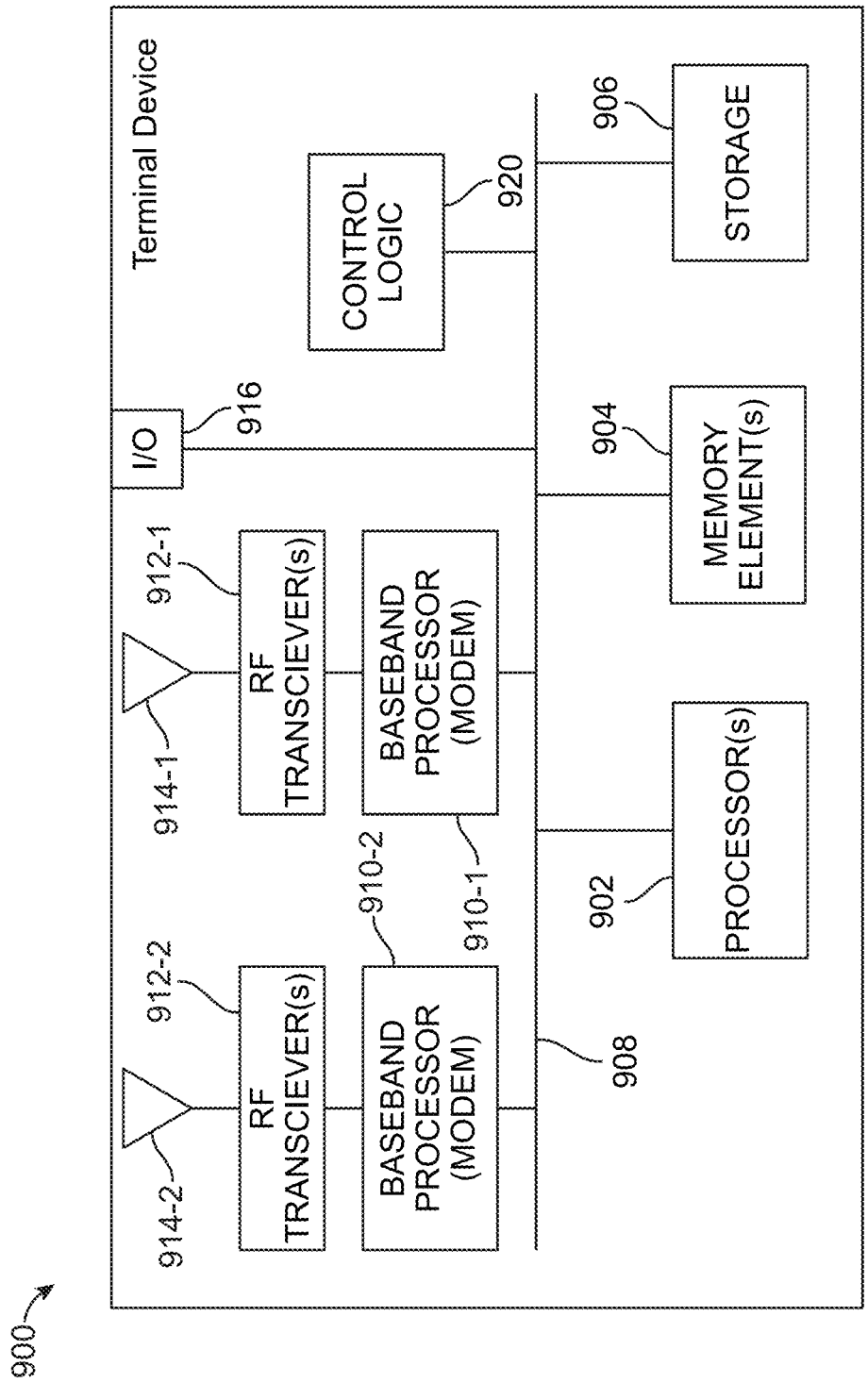
FIG. 9 is a block diagram of a terminal device configured to perform techniques presented herein, according to an example embodiment.

Referring to FIG. 9, FIG. 9 illustrates a block diagram of a device 900 that may be configured to operate as a terminal device 130 and perform functions associated with operations discussed herein.

In at least one embodiment, device 900 may be any apparatus that may include one or more processor(s) 902, one or more memory element(s) 904, storage 906, and a bus 908. Since the terminal device 900 has multi-access technology type capability, the device 900 includes, for a first access technology type, a baseband processor or modem 910-1, one or more radio RF transceiver(s) 912-1, one or more antennas or antenna arrays 914-1; and for a second access technology type, the device 900 includes a baseband processor or modem 910-2, one or more radio RF transceiver(s) 912-2, one or more antennas or antenna arrays 914-2. In the event that the multi-access technology type capability of the device 900 is wired access technology types, then the antennas or antenna arrays 914-1 and 914-2 are not needed. Moreover, the different access technology types could take the form of a combination of wired and wireless access technology types, such that the first access technology type is wired (e.g., Ethernet) and the second access technology type is wireless (e.g., WLAN or WWAN). The device 900 further includes one or more I/O interface(s) 916, and control logic 920.

The one or more processor(s) 902, one or more memory element(s) 904, storage 906, bus 908, and I/O interface(s) 916 may be configured/implemented in any manner described herein.

The RF transceiver(s) 912-1/912-2 may perform RF transmission and RF reception of wireless signals via antenna(s)/antenna array(s) 914-1/914-2, and the baseband processors (modem) 910-1/910-2 perform baseband modulation and demodulation, etc. associated with such signals of the respective access technology type.

In various embodiments, control logic 920, can include instructions that, when executed, cause processor(s) 902 to perform operations, which can include, but not be limited to, providing overall control operations of device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804/904 and/or storage 806/906 can store data, software, code, instructions (e.g., processor instructions), logic, parameters, combinations thereof, and/or the like used for operations described herein. This includes memory element(s) 804/904 and/or storage 806/906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

As described herein, in one form, a method is provide that includes obtaining a message in association with an access network connection by a terminal device via a first access network of a first access technology type, the message including failure information indicating a failure associated with an access network connection attempt by the terminal device via a second access network of a second access technology type; analyzing the failure information to determine one or more actions to enable connectivity by the terminal device via the second access network; and executing the one or more actions.

In another form, an apparatus is provided comprising a communication interface configured to enable network communications; and a processor coupled to the communication interface, wherein the processor is configured to perform operations including: obtaining a message in association with an access network connection by a terminal device via a first access network of a first access technology type, the message including failure information indicating a failure associated with an access network connection attempt by the terminal device via a second access network of a second access technology type; analyzing the failure information to determine one or more actions to enable connectivity by the terminal device via the second access network; and executing the one or more actions.

In still another form, one or more non-transitory computer readable storage media are provided, encoded with instructions that, when executed by a processor, cause the processor to perform operations including: obtaining a message in association with an access network connection by a terminal device via a first access network of a first access technology type, the message including failure information indicating a failure associated with an access network connection attempt by the terminal device via a second access network of a second access technology type; analyzing the failure information to determine one or more actions to enable connectivity by the terminal device via the second access network; and executing the one or more actions.

In another form, a method is provided comprising: attempting, by a terminal device, to connect to an enterprise network, via a first access network of a first access technology type; upon failure to connect via the first access network, determining, based on stored information at the terminal device, an identifier of a second access network of a second access technology type for connecting to the enterprise network; and sending, via the second access network of the second access technology type, a message including failure information indicating a failure associated with an access network connection attempt by the terminal device via the first access network.

In one form, an apparatus is provided comprising: a first access network transceiver configured to enable an access network connection via a first access network of a first access technology type; a second access network transceiver configured to enable an access network connection via second access network of a second access technology type; and a controller, wherein the controller is configured to: cause the first access network transceiver to attempt to connect to an enterprise network via the first access network of the first access technology type, and upon failure to connect via the first access network, determine, based on stored, an identifier of a second access network of a second access technology type for connecting to the enterprise network, and to cause the second access network transceiver to send, via the second access network of the second access technology type, a message including failure information indicating a failure associated with an access network connection attempt via the first access network.

In another form, one or more non-transitory computer readable storage media are provided, encoded with instructions that, when executed by a processor, cause the processor to perform operations including: attempting, by a terminal device, to connect to an enterprise network, via a first access network of a first access technology type; upon failure to connect via the first access network, determining, based on stored information at the terminal device, an identifier of a second access network of a second access technology type for connecting to the enterprise network; and sending, via the second access network of the second access technology type, a message including failure information indicating a failure associated with an access network connection attempt by the terminal device via the first access network.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a message in association with an access network connection by a terminal device via a first access network of a first access technology type, the message including failure information indicating a failure associated with an access network connection attempt by the terminal device via a second access network of a second access technology type, wherein connectivity to the first access network is provided using a first radio transceiver and connectivity to the second access network is provided using a second radio transceiver;
   analyzing the failure information to determine one or more actions to enable connectivity by the terminal device via the second access network; and
   executing the one or more actions, wherein the one or more actions include restoring connectivity between a network infrastructure entity and a dynamic host configuration protocol (DHCP) server, and providing instructions to the terminal device to update a driver software of the terminal device.

2. The method of claim 1, wherein obtaining comprises receiving the message sent by the terminal device to an infrastructure entity in an enterprise network.

3. The method of claim 2, wherein the failure information in the message indicates one or more failure details associated with the access network connection attempt via the second access network.

4. The method of claim 2, wherein executing the one or more actions further comprises:
sending an information message to the terminal device for presentation to a user of the terminal device, the information message containing user instructions to enable connectivity by the terminal device via the second access network.

5. The method of claim 4, wherein the user instructions include one or more of: a second access network identifier to be used by the terminal device to connect via the second access network, a correct user name, and a correct password.

6. The method of claim 2, wherein executing the one or more actions further comprises:
sending a configuration message to the terminal device, wherein the configuration message includes content to cause a configuration change at the terminal device in order to enable connectivity via the second access network.

7. The method of claim 6, wherein the content includes a certificate to be used by the terminal device to connect via the second access network.

8. The method of claim 2, further comprising:
validating a second access network identifier contained in the message that is associated with the second access network, against a first access network identifier associated with the first access network over which the message is received; and
determining to perform the executing of the one or more actions based on the validating.

9. The method of claim 1, wherein executing the one or more actions further comprises restoring connectivity between a network infrastructure entity and an access control policy server.

10. The method of claim 1, wherein executing the one or more actions further comprises:
detecting a coverage hole of the second access network; and
changing a configuration on one or more transceiver devices that serve connectivity via the second access network.

11. The method of claim 1, wherein obtaining comprises receiving the message sent by a first infrastructure entity in an enterprise network to a second infrastructure entity in the enterprise network or to the terminal device.

12. The method of claim 1, wherein the first access technology type of the first access network is a wireless local area network technology and the second access technology type of the second access network is a wireless wide area network technology, or the first access technology type of the first access network is a wireless wide area network technology and the second access technology type of the second access network is a wireless local area network technology.

13. The method of claim 1, wherein one or more of obtaining, analyzing and executing is performed at one or more of: a first controller for the first access network, a second controller for the second access network, a global controller coupled to the first controller and the second controller, and a converged controller that controls operations for the first access network and the second access network.

14. A method comprising:
attempting, by a terminal device, to connect to an enterprise network, via a first access network of a first access technology type;
upon failure to connect via the first access network, determining, based on stored information at the terminal device, an identifier of a second access network of a second access technology type for connecting to the enterprise network, wherein connectivity to the first access network is provided using a first radio transceiver and connectivity to the second access network is provided using a second radio transceiver, and wherein the stored information indicates one or more of a version of a driver software of the terminal device, and an identity of a network element at which the failure to connect occurred; and
sending, via the second access network of the second access technology type, a message including failure information indicating a failure associated with an access network connection attempt by the terminal device via the first access network.

15. The method of claim 14, further comprising, upon failure to connect via the first access network:
establishing an access network connection via the second access network to connect to the enterprise network.

16. The method of claim 14, further comprising:
receiving an information message for presentation to a user of the terminal device, the information message containing user instructions to enable connectivity by the terminal device via the first access network.

17. The method of claim 16, wherein the user instructions include one or more of: a second access network identifier to be used by the terminal device to connect via the second access network, a correct user name, and a correct password.

18. An apparatus comprising:
a communication interface configured to enable network communications; and
a processor coupled to the communication interface, wherein the processor is configured to perform operations including:
obtaining a message in association with an access network connection by a terminal device via a first access network of a first access technology type, the message including failure information indicating a failure associated with an access network connection attempt by the terminal device via a second access network of a second access technology type, wherein connectivity to the first access network is provided using a first radio transceiver and connectivity to the second access network is provided using a second radio transceiver;
analyzing the failure information to determine one or more actions to enable connectivity by the terminal device via the second access network; and
executing the one or more actions, wherein the one or more actions include restoring connectivity between a network infrastructure entity and a dynamic host configuration protocol (DHCP) server, and providing instructions to the terminal device to update a driver software of the terminal device.

19. The apparatus of claim 18, wherein the processor is configured to perform the obtaining by receiving the message sent by the terminal device to an infrastructure entity in an enterprise network.

20. The apparatus of claim 18, wherein the failure information in the message indicates one or more failure details associated with the access network connection attempt via the second access network, wherein the processor is configured to perform the executing by sending an information message to the terminal device for presentation to a user of the terminal device, the information message containing user instructions to enable connectivity by the terminal device via the second access network.

* * * * *